July 7, 1959
A. CLAUD-MANTLE
2,893,771
HANDLE-EQUIPPED LID FASTENER
Filed Nov. 6, 1956
3 Sheets-Sheet 1
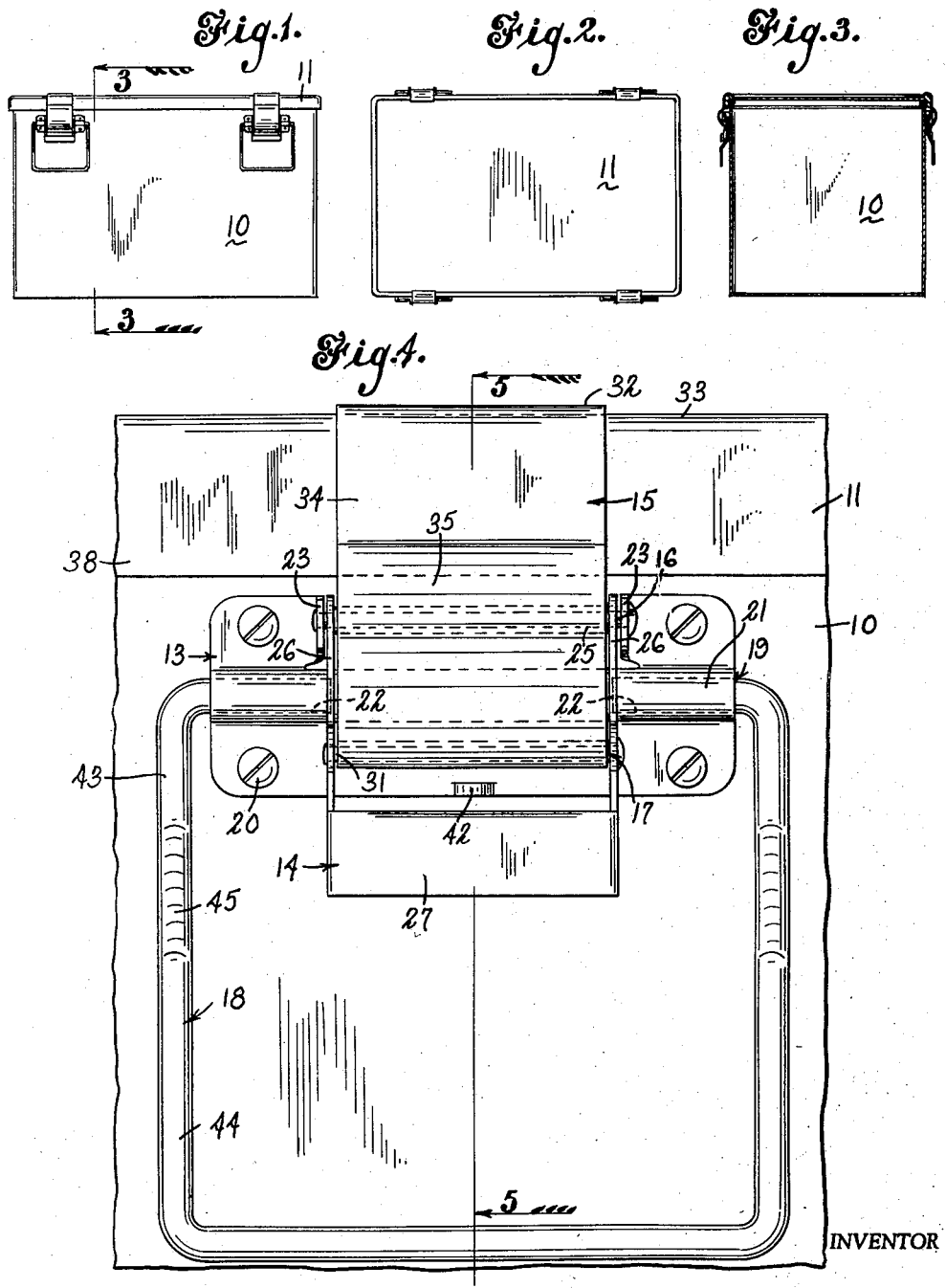
INVENTOR
A. Claud-Mantle
BY Rockwell Bartholow
ATTORNEYS

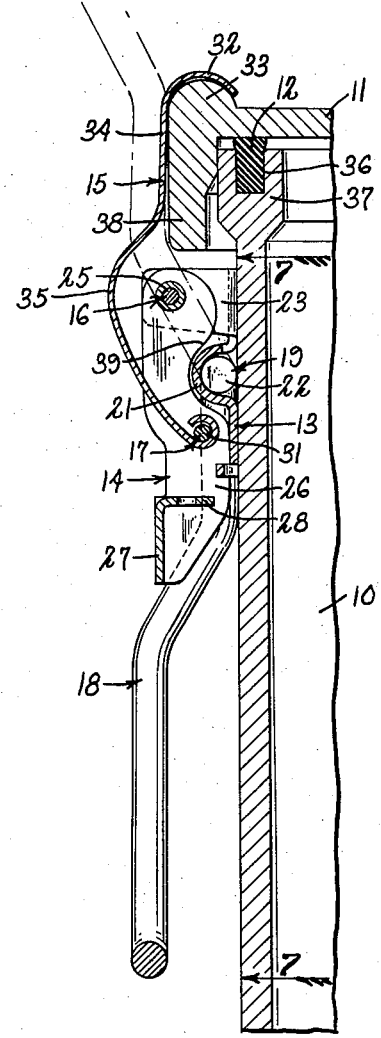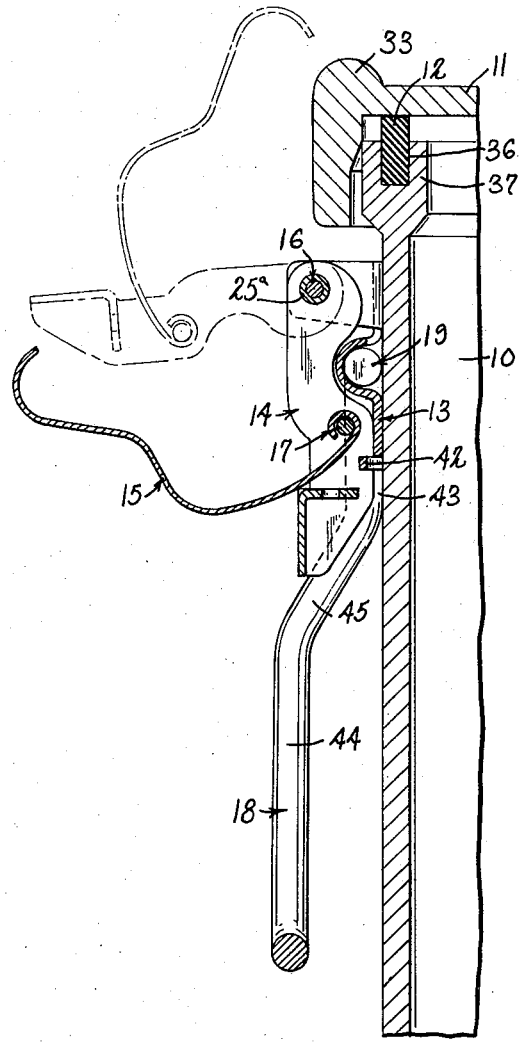

July 7, 1959
A. CLAUD-MANTLE
2,893,771
HANDLE-EQUIPPED LID FASTENER
Filed Nov. 6, 1956
3 Sheets-Sheet 3
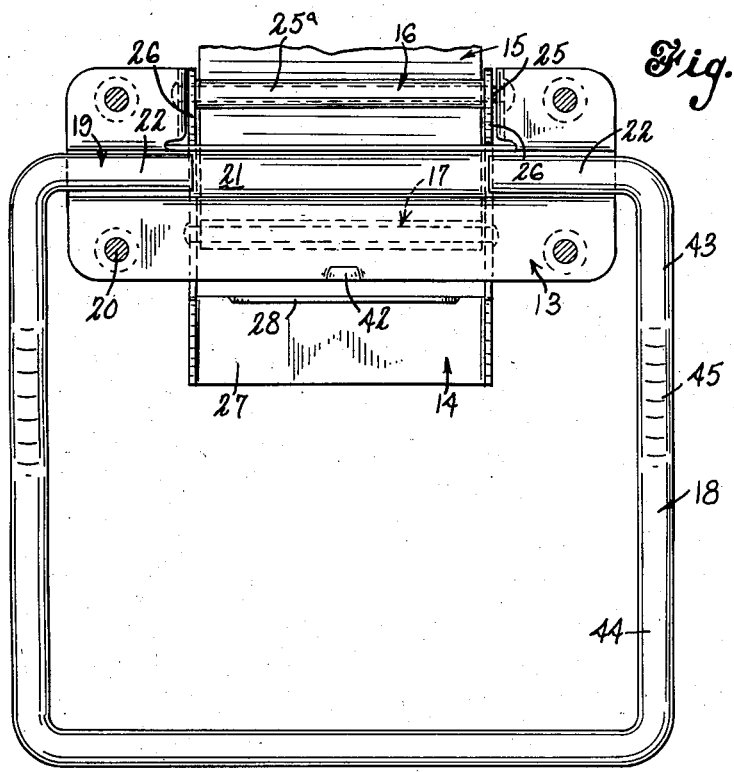
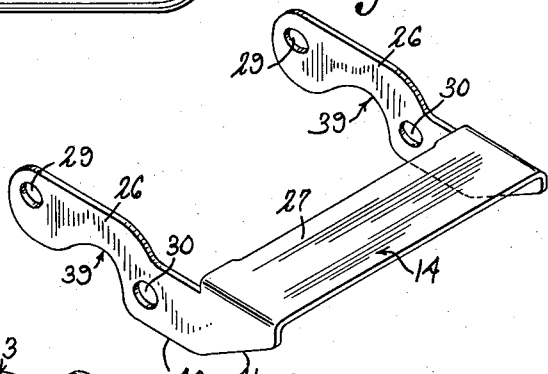
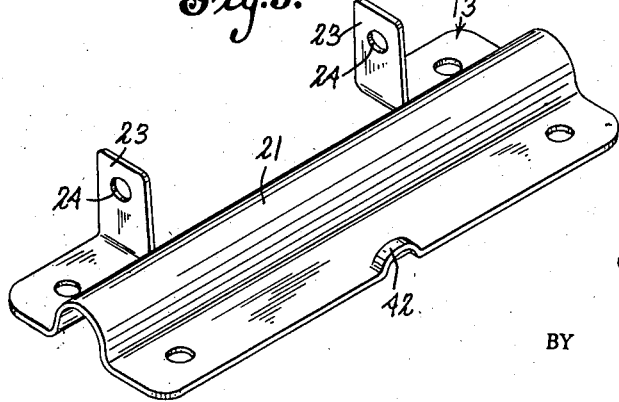
INVENTOR
A. Claud-Mantle
BY Rockwell & Barkholtz
ATTORNEYS ated July 7, 1959

United States Patent Office 2,893,771

HANDLE-EQUIPPED LID FASTENER

Arthur Claud-Mantle, Trumbull, Conn., assignor to The Bassick Company, Bridgeport, Conn., a corporation of Connecticut Application November 6, 1956, Serial No. 620,653

1 Claim. (Cl. 292—113)

This invention relates to fasteners employed for fastening the lids of boxes and like containers to the lower sections or bodies and more especially to fasteners that serve to compress an elastic gasket interposed between the lid and the box body for the purpose of providing a seal to protect the contents of the box from contamination, corrosion and like harmful effects.

One of the objects of the invention is to provide an improved fastener for boxes and containers of this general type.

Another object is to furnish a handle-equipped lid fastener structure providing means whereby the box may be more readily carried from place to place than has been possible heretofore.

A still further object of the invention is to improve the organization and form of the fastener which is applied to the box and to make a very durable and effective article which can be produced commercially at low cost.

Yet another purpose is to provide the box with a unitary fastener structure which, for mounting, is applied to the box body only, eliminating the need of mounting a separate fastener member on the box lid.

In the drawings:

Figs. 1, 2 and 3 are views showing a box equipped with fasteners embodying the invention, Figs. 1 and 2, respectively, being a side elevation and a top plan view and Fig. 3 being a section on line 3—3 of Fig. 1;

Fig. 4 is a fragmentary side elevation of the box showing one of the fasteners in the closed position;

Fig. 5 is a section on line 5—5 of Fig. 4;

Fig. 6 is a section similar to Fig. 5 showing the fastener in the released position;

Fig. 7 is a section on line 7—7 of Fig. 5;

Fig. 8 is a perspective view of the lower toggle member; and

Fig. 9 is a perspective view of the attaching plate.

In the form of the invention shown in the drawings the box may be understood to be formed of suitable metal although other material may be employed. The lid is shown as a shallow member having its upper surface formed to be engaged by the upper member of the fastener toggle, as this simplifies the structure of the fastener, but, if desired, the lid or upper section of the box may have greater depth. An elastic gasket is interposed between the upper edge of the box wall and the body of the lid and is compressed when, by the action of the fastening means, the lid is pulled down to the closed position. This is the arrangement when, as shown in Figs. 1, 2 and 3, the box is equipped with four fasteners, each side of the box being equipped with two fasteners.

The fastener which acts upon the lid for closing and locking it comprises an attaching plate applied to the wall of the box body and an over-center toggle pivoted to the attaching plate, said toggle having a lower member pivoted to the plate and an upper member pivoted to the first toggle member. In the locked position of the box the first or so-called lower toggle member depends from the upper part of the attaching plate and the second or upper toggle member, which is pivoted to the first toggle member intermediate of the ends of the latter, extends upwardly past the first toggle member and overlies the rim portion of the lid. The attaching plate not only serves as a pivotal mounting for the first toggle member but as a pivotal mounting for a bail-like carrying handle pivotally connected to the attaching plate at a point somewhat below the point where the first toggle member is pivoted.

In the drawings the box body is shown at 10, the lid at 11, the gasket at 12, the attaching plate at 13, the first toggle member or lever at 14, the second toggle member or lever at 15, the pivotal connection of the first toggle member to the attaching plate at 16, the pivotal connection of the second toggle member to the first at 17, the carrying handle at 18 and the pivot mounting of the carrying handle at 19.

The attaching plate 13 is preferably made of sheet metal in the form shown in Fig. 9, the same being a relatively long plate of small vertical dimension provided with holes by means of which it can be attached to the box body by suitable members illustrated as screws 20. Between its upper and lower edges this plate is bent to form a longitudinally rearwardly facing channel 21. It is within this channel 21 that the pivoting part of the handle 18 is located, this handle being in the form of a bail made from a metal rod and normally depending from the plate and having inturned upper ends 22 engaged in the end portions of the channel 21. Above the channel part 21 of the plate, this plate is cut away and bent to provide integral lugs 23 that extend forwardly from the plate, each being provided with a hole 24 in which is located a cross pin 25 that is surrounded by a loose sleeve 25ª and interconnects the lugs 23 and serves as a fixed pivot member forming a part of the pivotal connection 16 between the first toggle member 14 and the attaching plate. The toggle member 14 is shown in detail in Fig. 8 and this is a sheet metal member having side elements 26 integrally connected to a cross piece 27, which cross piece 27 serves as a manipulating member for this toggle member. When the fastener is in the position shown in Fig. 5, the cross piece or manipulating member 27 is at the lower end of the toggle structure, and it will be noted from Fig. 5 that member 27 has at its upper part an integral flange 28 extending toward the adjacent box wall. The cheek-like side pieces 26 of this toggle member are each provided at the free end with a hole 29 through which the above-mentioned pin 25 is passed for pivoting purposes and the ends of the pin 25 are riveted over so that toggle member 14 is permanently pivoted to the attaching plate.

Near the cross piece or manipulating part 27 the respective side pieces 26 are provided with holes 30 which holes are used in providing the pivotal connection 17 between this toggle member 14 and the toggle member 15. This pivotal connection includes a cross pin 31 passing through the holes 30 and through the lower part of the second toggle member (Fig. 5), the ends of the pin 31 being riveted over as in the case of the pin 25.

The second toggle member 15 is preferably made of a single plate of springy sheet metal bent to the shape shown in Fig. 6. The lower end portion of this resilient plate is curled to provide a socket for the pivot pin 31. The upper end of this toggle member 15 is formed to provide a curved lip 32 that is adapted to engage and conform to a strengthening bead 33 formed on the upper marginal portion of the lid 11. Immediately below the lip 32, which is in the nature of a hook, the springy toggle member has a portion 34 adapted to contact the side of the lid (Fig. 5) and below this portion the member 15 is bowed outwardly as indicated at 35 so that in the closed position of the box it will clear the upper end of the toggle member 14 and the mounting for said upper end.

In this form the gasket 12 is received in a groove 36 provided in a widened wall portion 37 provided at the upper end of the box body, and the lid is provided with a short depending wall portion 38 serving to center the lid on the box body. The preferred arrangement of the cooperating portions of the lid and box body is as shown in the drawings but other arrangements may be employed.

Reverting to the toggle member 14 it is noted that the side pieces or elements 26 each have in a location between the end hole 29 and the intermediate hole 30 a rear edge curved inwardly as indicated at 39, so that in the closed position of the fastener (Fig. 5) this toggle member will clear but be in close proximity to the channel portion 21 of the attaching plate. It should also be noted that below the curved edge portion 39 each side piece has a straight edge portion 40 which in the closed position of the fastener abuts the face of the attaching plate at the lower part of the latter, thus providing a stop for this member of the toggle. Below the straight edge portion 40 the side piece 26 has a sloping edge portion 41. This is at the side of the toggle member that is opposite the integral cross piece 27 and this structure provides for easier manipulation of the toggle member 14 in releasing the fastener.

If desired the toggle member may be held in the closed position by a fastener device having a wire or the like that passes through openings provided respectively in the flange 28 and in the lower portion of the attaching plate. For this purpose a hole is provided in the flange 28, as shown in the drawings, and a bent-up integral loop part 42 adjacent the lower edge of the attaching plate provides a cooperating hole. In the closed position of the fastener the parts provided with these holes are readily accessible inasmuch as they are located in a space between the lower end of the upper toggle member and the lower extremity of the lower toggle member.

The upper toggle member is one of substantial width and the manipulating portion 27, 28 of the lower toggle member has substantially the same width. The attaching plate on the box body has substantially greater width than the toggle structure and the carrying handle is of greater width than the attaching plate. As shown in Fig. 5, the side members of the handle are offset by bending so that the lower part of the handle in the normal dependent position of the handle is spaced outwardly from the adjacent part of the box wall while the upper portion of the handle lies in contact with the wall. The upper and lower parts of the handle, indicated respectively at 43 and 44, are substantially parallel to each other and at each side there is between them an angular bend or offset 45. The upper part 43 is substantially shorter than the lower part 44.

It is believed that from the foregoing description the operation of the fastener will be quite clear. When the lid has been placed and centered on the box body the parts will have the position shown in full lines in Fig. 6. For closing the fastener the lower toggle member will be swung upwardly and outwardly from the position shown in full lines in Fig. 6 to one in which the upper toggle member can be engaged with the bead of the lid. The lower toggle member is then moved downwardly to the locking position so as to draw the lid downwardly under spring pressure of the deformable upper toggle member and place the gasket under the requisite compression. In raising the lower toggle member from the locked position the fingers of the operator are introduced from beneath into the space between the flanges 27 and 28 of the manipulating portion, and the inclined edge portions 41 increase the facility of access to this part of the toggle. In moving downwardly the lower toggle member in order to close the fastener, the requisite pressure of the hand can be exerted against the front or outer face of the manipulating part 27, 28.

The handle 18 normally has the dependent position referred to above where its lower end is accessible for grasping. For carrying the box, the handle is swung upwardly to the position shown by the broken lines in Fig. 5, and it is to be noted that in this position the handle will project upwardly to a substantially extent beyond the box lid. In this upper position the offset part 45 of the handle will abut the side of the lid for the purpose of stopping the handle in a position in which its upper part will be in the optimum location for carrying. In the example shown it may be assumed that the contents are sufficiently weighty to require four men for transporting the box, each man grasping with one hand one of the handles. When the box is so carried the provision of handles of the described structure and arrangement is advantageous because, as the grasping portion of the handle is in a vertical plane spaced outwardly from that of the box side, there will be inhibition of contact of the box side with the leg of a man serving as a carrier. The pivotal movement of the handle, as above described, takes place when the terminals 22 turn in the channel 21, these terminals being held in the channel by a portion of the box wall that extends across the channel. By this construction the handle is pivoted to the box in a very simple and effective manner. The extent of projection of the terminals endwise into the channel may be as shown in Fig. 7, and it is noted that each of the terminals is located between closely adjacent members securing the attaching plate to the box.

The described structure is very effective for the purposes indicated and a simple, durable article can be produced commercially at relatively little cost. Among other advantages is the fact that the fastener and handle structure is a unitary device requiring mounting on the box body only. The described structure wherein the upper end of the handle is held in place in a rearwardly facing channel closed by the box wall is also advantageous.

It is to be understood that the present disclosure is by way of example only, and that various modifications and changes in detail may be made without departure from the scope of the invention as defined in the claim.

What I claim is:

In a lid fastener for a box having a lid to be drawn downwardly against the upper end of a box body, a long and narrow attaching plate for mounting on the wall of the box body adjacent the upper end of the box, said plate having at the upper part thereof a pair of outstanding lugs spaced from each other and defining a horizontal plane, said plate having below said lugs a continuous longitudinal channel facing toward the box and extending in a plane parallel to the plane of said lugs, said channel being intermediate the upper and lower edges of said plate, a bail-like handle having side members with upper ends engaging in the ends of said channel for pivotally mounting said handle, said handle being normally pendent from said plate and having a lower grasping portion spaced downwardly from the lower edge of said plate, a toggle lever pivoted at one end between said lugs and having a free end, a resilient plate pivoted to said lever between the ends of the latter and adapted to engage the margin of a box lid to pull the lid downwardly, the length of said channel being substantially greater than the width of said lever and said resilient plate and in which the handle is wider than the length of the attaching plate, whereby said toggle lever in the fastened position has its free end extended downwardly beyond the lower edge of said attaching plate to an extent such that the end of said lever is spaced upwardly from said lower grasping portion of said handle and is readily accessible for releasing the fastener.

References Cited in the file of this patent

UNITED STATES PATENTS

| | | |
|---|---|---|
| 1,381,855 | Ashcraft | June 14, 1921 |
| 1,698,928 | Wentrof | Jan. 15, 1929 |
| 2,472,285 | Claud-Mantle | June 7, 1949 |
| 2,704,218 | Claud-Mantle | Mar. 15, 1955 |
| 2,743,029 | Mautner | Apr. 24, 1956 |